(No Model.)

H. PETERSON.
PLOW.

No. 442,200.   Patented Dec. 9, 1890.

Witnesses:
Horace G. Seitz
W. S. Duvall

Inventor
Hans Peterson
By his Attorneys,
C. A. Snow & Co.

THE NORRIS PETERS CO., PHOTO-LITHO., WASHINGTON, D. C.

UNITED STATES PATENT OFFICE.

HANS PETERSON, OF ROUND ROCK, TEXAS.

PLOW.

SPECIFICATION forming part of Letters Patent No. 442,200, dated December 9, 1890.

Application filed August 1, 1890. Serial No. 360,663. (No model.)

*To all whom it may concern:*

Be it known that I, HANS PETERSON, a citizen of the United States, residing at Round Rock, in the county of Williamson and State of Texas, have invented a new and useful Plow, of which the following is a specification.

This invention has relation to improvements in plows.

The objects of the invention are to provide a plow adapted for steady and easy running, capable of combining therewith various styles of shovels or shears, and so constructing said plow as to be readily adjusted to form furrows of varying depths.

Other objects of the invention will hereinafter appear in the following description and be particularly pointed out in the claims.

Figure 1:
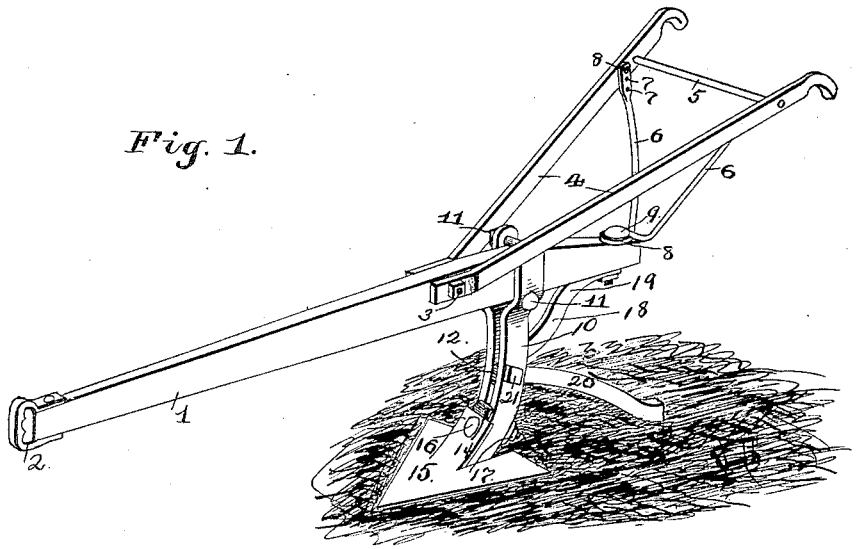
Figure 2:
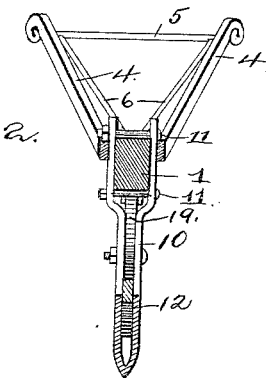
Figure 4:
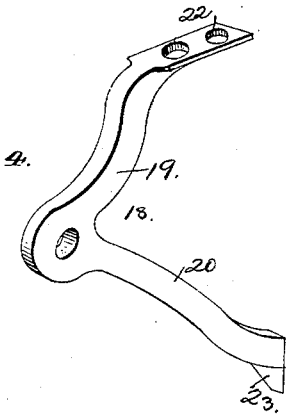
Figure 3:
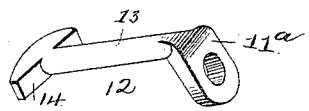

Referring to the drawings, Figure 1 is a perspective. Fig. 2 is a central vertical section, and Fig. 3 is a detail in perspective of the plow-standard brace. Fig. 4 is a perspective in detail of a stop-clip employed in connection with the standard and shovel.

Like numerals of reference indicate like parts in all the figures of the drawings.

1 designates the plow-beam, which is of the usual construction and provided at its front end with the clevis 2. To the sides of the beam are bolted, as at 3, the lower ends of a pair of diverging upwardly-disposed inclined handles 4, connected by a transverse rung 5.

6 designates a V-shaped brace, the terminals of which are provided with a series of perforations 7, and through one perforation of each series is passed an adjusting-bolt 8, said bolt taking into one of the handles, whereby the same may be adjusted up and down to suit the operator. The lower portion of the brace is bent to form an eye 8, and rests upon the heel or rear end of the beam, and through said eye and beam is passed a bolt 9. The standard 10 is bifurcated, and its opposite bifurcations embrace the beam at opposite sides in rear of the pivot of the handles. Bolts 11 are passed through the bifurcations above and below the beam and are such a distance apart as to permit the standard to swing slightly.

12 designates a stop-clip, consisting of a circular perforated base 11ª, adapted to take against the rear edges of the bifurcations of the standard, a central stem portion 13, designed to pass between the bifurcations, and a T-head 14, designed to be disposed across the front edges of the bifurcations.

15 designates the shovels, which may be either of the sweep pattern, as shown, bull-tongue, turning-shovel, or other style, and through the same, at its center and near its upper edge, is passed a binding-bolt 16, said bolt passing through the bifurcations and through the perforated base-plate of the stop-clip, beyond which there is provided a nut 17, which binds against the rear face of the clip-stop, as shown. When in position, the upper edge of the shovel rests under the transverse T-head of the stop-clip, and said shovel is by the aid of the bolt rigidly maintained in position.

18 designates an angular brace comprising upwardly and downwardly disposed rearwardly-tending branches 19 and 20, respectively. At the angle of the branches the same is interposed between the bifurcations, and through said bifurcations and the brace is passed a pivot-bolt 21. The upper branch of the brace is provided with a series of openings 22, and through one of said openings passes the set-bolt which connects the V-shaped handle-brace with the beam. The lower branch 20 of the brace terminates in rear of the standard, and is there provided with a depending tooth 23, the front edge of which is inclined and reduced to form a cutting-edge.

By arranging the handle-brace connecting-bolt in the various perforations of the angular brace the standard is swung to various inclined positions calculated to run the plow deeper or shallower, in accordance therewith. When the standard is elevated so as to run the plow shallower, the lower branch of the angular brace is further depressed, so that the same acts to steady the plow, and runs along in the bottom of the furrow. On the contrary, when the standard is brought nearer to a vertical position, and consequently the plow runs deeper, so much support is not required, and the lower portion of the angular brace is elevated proportionately, and thus the extra draft necessary to drag the same is obviated.

It will be readily appreciated by those conversant with the operation of plows the ease with which a plow constructed in accordance with my invention may be operated, and also the simple, rigid, and easy manner in which various styles of shovels may be employed.

Having described my invention, what I claim is—

1. In a plow, the combination, with the beam and the loosely-depending standard provided at its lower end with a shovel, of the angular brace pivoted at its angle to the standard, adjustably connected at its upper end or branch to the beam, and having its lower end adapted to travel along the furrow in rear of the shovel and terminating at its rear end in a depending tooth, substantially as specified.

2. In a plow, the combination, with the beam and the loosely-depending bifurcated standard provided at its lower end with a shovel, of the angular pivoted brace pivoted between the bifurcations of the standard, the upper branch of the brace being provided with a series of adjusting-holes and terminating under the beam, an adjusting-bolt passing through the beam and one of the perforations of the series, and the lower branch of said brace terminating in rear of the standard and provided with a depending beveled sharpened tooth or blade, substantially as specified.

In testimony that I claim the foregoing as my own I have hereto affixed my signature in presence of two witnesses.

HANS PETERSON.

Witnesses:
 H. R. RUSCH,
 W. H. TRIGGS.